Patented Jan. 14, 1941

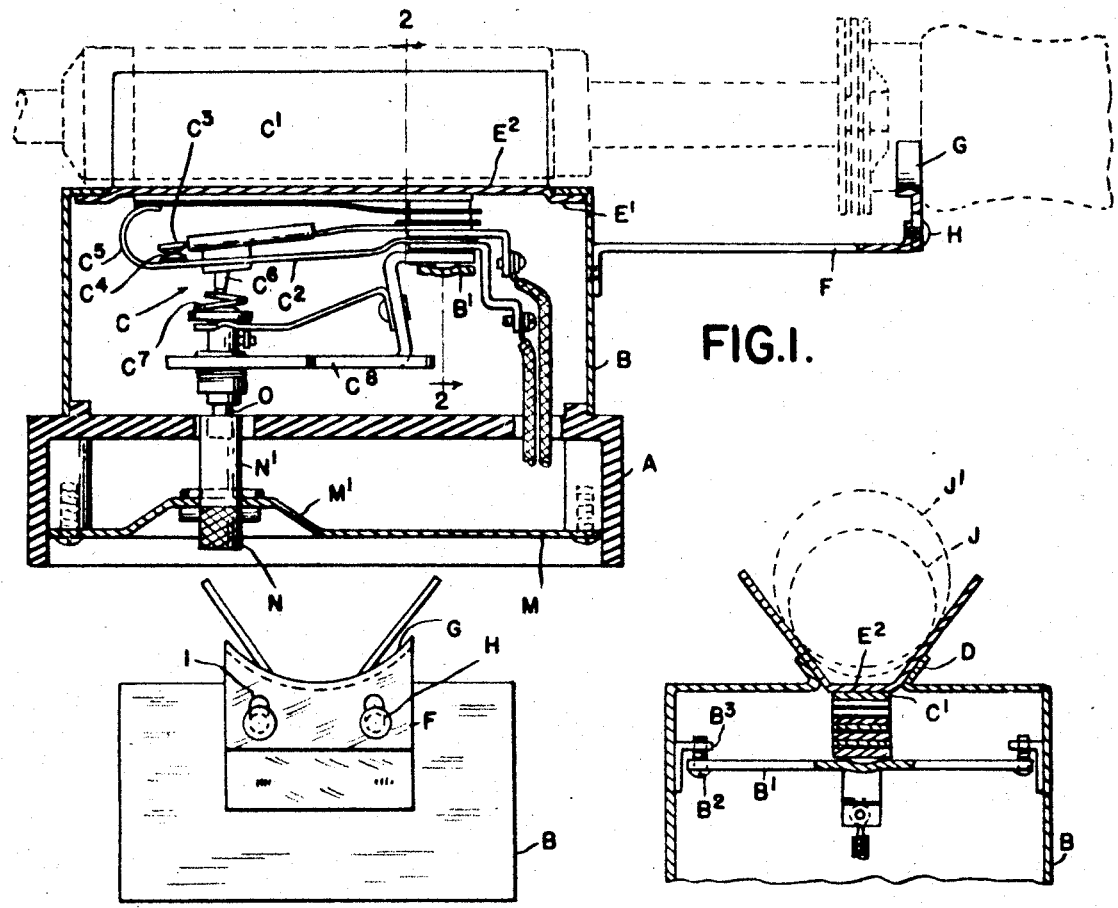
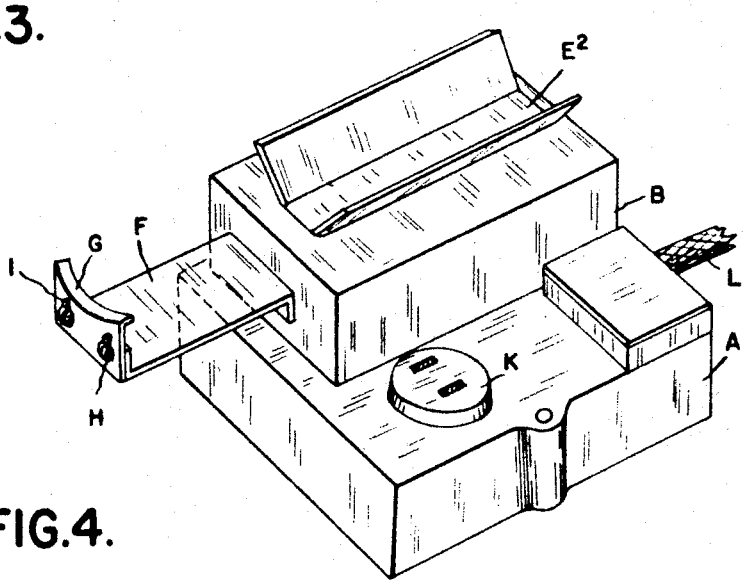

2,228,571

UNITED STATES PATENT OFFICE 2,228,571

TEMPERATURE REGULATING STAND FOR ELECTRICALLY HEATED TOOLS

Frank Kuhn, Detroit, and Laurence H. Thomas, Birmingham, Mich., assignors to American Electrical Heater Company, Detroit, Mich., a corporation of Michigan Application April 10, 1939, Serial No. 267,117

5 Claims. (Cl. 219—23)

The invention relates to temperature regulating stands for electrically heated tools and more particularly to a stand for receiving electrically heated soldering irons when not in use. With tools of this character it is desirable to maintain a substantially constant temperature in the working point, so that it will be ready at any time for service. However, the rate of heat generation required to maintain this temperature when the tool is in use is such as to cause over-heating when the tool is idle. This is detrimental both to the instrument and to the work when the tool is again used.

It is the object of the invention to provide a stand on which the tool may be laid when not in use and which will thermostatically control its temperature. To this end the invention consists in the construction as hereinafter set forth.

In the drawing:

Figure 1 is a vertical longitudinal section through our temperature regulating stand;

Figure 2 is a cross section on line 2—2 of Figure 1;

Figure 3 is an end elevation of the handle supporting bearing;

Figure 4 is a perspective view of the stand.

Electrically heated soldering irons and like tools are usually formed with a cylindrical casing which contains the heating element and which is in proximity to the working point of the tool. There is also a shank extending rearward from this casing which is attached to the handle and the electrical connections for the tool extend through this handle and shank. While it is possible to provide instruments of this character with thermostatic switches for regulating the temperature this increases the complexity and cost of production. Furthermore, where tools differing in size are alternatively used this would require an individual thermostatic regulator for each tool. To avoid such complexity we have provided a temperature regulating stand which is capable of use with various instruments and which will maintain the desired temperature in the tool whenever supported thereon. Thus, a single thermostatic control will serve the purpose of regulating the temperature in all of the tools which may be alternatively used.

Our improved stand comprises essentially a cradle for supporting the electrically heated portion of the tool, said cradle being formed of material of relatively high thermal conductivity and having directly connected therewith the thermostatic electrical switch. These elements are mounted on a suitable supporting base and a bracket arm served to support the handle of the instrument. The base is provided with a plug socket with which the flexible cord for the tool may be connected, and electrical connections within the base are so arranged that the thermostatic switch is interposed between the electrical service connection and the electrical connection to the tool. More in detail, A is a hollow base member preferably formed of insulating material. B is a metallic casing mounted on this base and which houses a thermostatic electrical switch C. The specific construction of this switch is not a part of the instant invention, but it comprises generally a composite thermostatic bar C', insulated resilient strips $C^2$ and $C^3$ having cooperating contacts $C^4$ at their free ends, the strip $C^2$ having the return-bent portion $C^5$, which bears against the free end of the thermostatic bar C', being held in this position by suitable means, such as a clamping bar B' attached to the casing B by screws $B^2$ engaging lugs $B^3$. There is also an adjusting mechanism comprising an insulated arm $C^6$ projecting from the strip $C^3$ and a spiral cam $C^7$ engaging said arm so that by rotating this cam the strip $C^3$ may be adjusted into different positions. The whole structure is mounted on a suitable frame $C^8$ which is secured within the casing B. The top of the casing B has a longitudinally extending opening therein with flanges D struck up on opposite sides thereof. E is a cradle member formed of metal of relatively high thermal conductivity, such as copper, and preferably of a substantially V-shaped cross section. This member is supported upon the flanges D and is retained thereon by flanges E' at opposite ends which are bent under the top of the casing B. The member E also has a flat bottom portion $E^2$ against which the thermostatic member C' is pressed. Thus any heat communicated to the cradle will be conducted therethrough directly into this thermostatic member.

To support the tool in the cradle we have provided a bracket arm F which extends outward from the casing B and at its outer end is provided with a bearing member G. This is concave or cradle-shaped and is vertically adjustably secured to the bracket F by screws H passing through slots I. This permits of raising or lowering the bearing member G so that the electrically heated portion of the tool will be held in parallelism with the cradle E, and will form line contacts with the V-shaped flange thereof. The cradle is adapted to receive tools of various diameters as indicated by the dotted circles J and J', Figure 2.

The base A is provided with a plug socket K to which the flexible conductor of the tool may be attached and the space within the hollow base provides for the electrical connections between this socket, the thermostatic switch, and the service connection L. A bottom plate M serves to close these electrical connections within the base and this plate has an inwardly embossed portion M' in which is swiveled a rotary knob N. This knob has a socket N' for engaging a rotary shaft O connected to the cam C⁷. The construction is such that by rotating the knob N the cam C⁷ may be adjusted to vary the temperature at which the thermostatic switch will open the electrical circuit.

With the construction as described in use, the stand A may be secured at any convenient location. The soldering iron or other tool may then be connected into the socket K and when not in use can be placed in the cradle E, the handle of the tool being supported by the bearing G. In this position a portion of the heat generated by the electrical heating unit will be conducted through the cradle E to the thermostatic bar C', so that any rise in temperature above a predetermined point will cause the buckling of this bar and the opening of the thermostatic switch. This will temporarily cut off current from the heating unit of the tool, but if the temperature of the tool drops below a predetermined point the circuit will be re-established. Thus by properly adjusting the regulating knob N any desired temperature may be maintained in the tool while it is supported by the cradle.

Where the tool is exchanged for one of a larger or smaller size this also can be supported in the cradle. It may, however, be necessary to vertically adjust bearing G so as to hold the cylindrical casing for the heating unit for the tool with its axis parallel to the cradle. This will form line contacts between the casing of the tool and the V-shaped flanges of the cradle, thereby establishing good thermal conductivity.

What we claim as our invention is:

1. In a temperature regulating stand for electrically heated tools having cylindrical outer casings surrounding the heating element, a cradle for supporting the tool provided with divergent side portions for receiving tools of different diameters forming two lines of contact therewith and also provided with a bottom portion integral with said side portions, and a thermostatic switch for controlling the circuit of said tool arranged beneath and secured to said bottom portion to receive heat by conduction directly therefrom.

2. In a temperature regulating stand for electrically heated tools having cylindrical outer casings surrounding the heating element, a cradle formed of material having high thermal conductivity and provided with divergent side portions for engaging tools of different diameters forming two lines of contact therewith and also provided with a bottom portion integral with said side portions, a thermostatic switch for controlling the circuit of said tool arranged beneath and secured to said bottom portion to receive heat by conduction directly therefrom, electrical connections to said switch, and a casing surrounding said switch and electrical connections and supporting said cradle.

3. In a temperature regulating stand for electrically heated tools having cylindrical outer casings, a cradle provided with divergent side portions for receiving tools of different diameters, and a bottom portion integral with said side portions, a thermostatic switch for controlling the circuit of said tool arranged beneath and secured to said bottom portion to receive heat by conduction directly therefrom, electrical connections for said switch, a casing surrounding said switch and electrical connections and supporting said cradle, an arm projecting laterally from said casing and an additional support for said tool at the outer end of said arm vertically adjustable to hold the cylindrical portion of the tool in line contact with each of the divergent sides of the cradle.

4. A temperature regulating stand for electrically heated tools having cylindrical outer casings comprising an insulator base provided with a plug socket for the flexible electrical connection to the tool, a casing on said base, a cradle formed of material having high thermal conductivity mounted on said casing, said cradle having divergent side portions projecting above said casing for receiving tools of different diameters, and a bottom portion integral with said side portions arranged in a slot in said casing, a thermostatic switch within said casing secured to said bottom portion to receive heat by conduction directly therefrom, an electrical service connected with said base, electrical connections between said service, thermostatic switch and plug socket, an arm projecting laterally from said casing, and an additional support for the handle of said tool vertically adjustably mounted on the outer end of said arm and adapted to hold the cylindrical portion of said tool in line contact with each of said divergent side portions of the cradle.

5. A temperature regulating stand for electrically heated tools comprising a hollow insulator base provided with an electrical service connection and a plug socket for the flexible conductor of the tool, a metallic casing mounted on said base, a thermostatic switch enclosed within said casing, electrical connections between said thermostatic switch, plug socket and electrical service, a cradle of V-shaped cross section mounted on said casing in thermal conductive relation to said switch, said saddle being adapted to receive the heated portions of tools of different diameters, an arm projecting laterally from said casing, a bearing vertically adjustably secured to the outer end of said arm for engaging an unheated portion of the tool to retain the heated portion thereof in parallel relation to said cradle, and means operable from outside said casing and hollow base for varying the temperature at which said thermostatic switch operates.

FRANK KUHN.
LAURENCE. H. THOMAS.